US011951496B2

United States Patent
Johnson

(10) Patent No.: US 11,951,496 B2
(45) Date of Patent: Apr. 9, 2024

(54) PROBE

(71) Applicant: Liqui-Box Corporation, Richmond, VA (US)

(72) Inventor: James W. Johnson, Delaware, OH (US)

(73) Assignee: LIQUI-BOX CORPORATION, Richmond, VA (US)

( * ) Notice: Subject to any disclaimer, the term of this patent is extended or adjusted under 35 U.S.C. 154(b) by 667 days.

(21) Appl. No.: 16/920,725

(22) Filed: Jul. 5, 2020

(65) Prior Publication Data

US 2021/0001360 A1    Jan. 7, 2021

Related U.S. Application Data

(60) Provisional application No. 62/870,937, filed on Jul. 5, 2019.

(51) Int. Cl.
*B05B 11/00* (2023.01)
*B05B 1/22* (2006.01)
*B05B 1/30* (2006.01)

(52) U.S. Cl.
CPC ............ *B05B 11/0013* (2013.01); *B05B 1/22* (2013.01); *B05B 1/3006* (2013.01)

(58) Field of Classification Search
CPC .......... B67D 1/0829–0854; B05B 1/22; B05B 1/3006; B05B 11/0013
See application file for complete search history.

(56) References Cited

U.S. PATENT DOCUMENTS

| 1,016,135 | A | * | 1/1912 | Foans ..................... B67B 7/26 222/90 |
| 1,249,577 | A | * | 12/1917 | White ............................ 222/91 |
| 2,007,449 | A | * | 7/1935 | Kernodle .................. B67B 7/26 222/542 |
| 2,023,397 | A | * | 12/1935 | Blomgren ................. B67B 7/26 222/542 |
| 2,712,886 | A | * | 7/1955 | Ernest ..................... B65D 25/48 222/91 |

(Continued)

FOREIGN PATENT DOCUMENTS

| DE | 198 39 841 A1 | 3/2000 |
| EP | 1 352 843 A1 | 10/2003 |

(Continued)

OTHER PUBLICATIONS

PCT, Notification of Transmittal of the International Search Report and the Written Opinion of the International Searching Authority, or the Declaration, dated Sep. 10, 2020, PCT/US2020/040845, 17 pages.

*Primary Examiner* — Paul R Durand
*Assistant Examiner* — Randall A Gruby
(74) *Attorney, Agent, or Firm* — McAndrews, Held & Malloy, Ltd.

(57) ABSTRACT

The disclosure provides methods and probes used to dispense flowable materials from a packaged source, such as a bag in box container. The probes are adapted to engage with one or more dispensing components, for example, spouts, faucets, caps, bags, boxes, or other dispensing components. The disclosure also provides methods of using the probe, including connecting the probe to one or more dispensing components, for example flip caps, and methods of dispensing the packaged flowable material.

13 Claims, 10 Drawing Sheets

(56) References Cited

U.S. PATENT DOCUMENTS

| | | | | |
|---|---|---|---|---|
| 3,549,049 A * | 12/1970 | Weber | | B67B 7/26 |
| | | | | 222/91 |
| 3,599,836 A * | 8/1971 | Hegi | | B67B 7/26 |
| | | | | 222/90 |
| 3,927,803 A * | 12/1975 | Weber | | B67B 7/26 |
| | | | | 222/91 |
| 3,973,698 A * | 8/1976 | Kato | | B67B 7/26 |
| | | | | 222/91 |
| 4,440,316 A | 4/1984 | Christine | | |
| 4,712,714 A * | 12/1987 | Mucciarone | | B67B 7/26 |
| | | | | 222/91 |
| 4,765,511 A | 8/1988 | Clements | | |
| 4,826,500 A * | 5/1989 | Rautsola | | A61J 1/1406 |
| | | | | 222/91 |
| 4,867,324 A * | 9/1989 | Rogosich | | A61J 11/04 |
| | | | | 215/11.1 |
| 5,090,596 A * | 2/1992 | Knight | | B67B 7/26 |
| | | | | 222/91 |
| 5,141,133 A * | 8/1992 | Ninomiya | | B67B 7/26 |
| | | | | 222/541.2 |
| 5,330,076 A * | 7/1994 | Tsuruta | | B65D 75/5877 |
| | | | | 222/83 |
| 5,671,770 A * | 9/1997 | Rusche | | B67B 7/26 |
| | | | | 408/241 B |
| 5,732,853 A * | 3/1998 | Ganzeboom | | B65D 75/70 |
| | | | | 222/89 |
| 6,364,178 B1 | 4/2002 | Paczonay | | |
| 6,398,075 B1 * | 6/2002 | Laciacera | | B65D 5/748 |
| | | | | 222/91 |
| 6,820,764 B2 * | 11/2004 | Miani | | B65D 5/748 |
| | | | | 222/91 |
| 6,971,548 B2 * | 12/2005 | Smith | | B67D 1/0078 |
| | | | | 222/83 |
| 7,150,476 B2 * | 12/2006 | King | | F16L 47/345 |
| | | | | 285/197 |
| 7,484,641 B2 * | 2/2009 | Casale | | B65D 5/748 |
| | | | | 222/83.5 |
| 7,959,032 B2 * | 6/2011 | Bolli | | B65D 5/748 |
| | | | | 222/93 |
| 7,980,424 B2 * | 7/2011 | Johnson | | B67B 7/26 |
| | | | | 222/105 |
| 9,067,714 B2 * | 6/2015 | Barron | | B65D 47/06 |
| 9,592,944 B2 * | 3/2017 | Johnson | | B65D 75/5872 |
| 9,751,678 B2 * | 9/2017 | Macler | | B65D 75/5877 |
| 10,005,654 B2 * | 6/2018 | Kraenzle | | B67D 1/1277 |
| 10,179,677 B2 * | 1/2019 | Stever | | B65D 37/00 |
| 10,287,081 B2 * | 5/2019 | Stever | | B65D 77/068 |
| 10,392,157 B2 * | 8/2019 | Barron | | B23D 61/028 |
| 10,609,939 B2 * | 4/2020 | Harding | | A47J 19/02 |
| 10,676,261 B2 * | 6/2020 | Berge | | B65D 51/222 |
| 10,843,914 B1 * | 11/2020 | Weatherly | | B65D 83/00 |
| 10,981,190 B2 * | 4/2021 | Johnson | | B05B 15/65 |
| 11,027,960 B2 * | 6/2021 | Kraenzle | | B67D 1/0462 |
| 11,247,838 B2 * | 2/2022 | Cedergren | | B65D 77/068 |
| 2007/0062709 A1 * | 3/2007 | Berman | | B65D 5/748 |
| | | | | 166/386 |
| 2007/0205216 A1 * | 9/2007 | Smith | | B65D 51/226 |
| | | | | 222/81 |
| 2008/0029540 A1 * | 2/2008 | Johnson | | B65D 75/5877 |
| | | | | 222/83 |
| 2010/0176152 A1 | 7/2010 | Johnson | | |
| 2010/0224629 A1 * | 9/2010 | Schroeder | | B65D 75/5877 |
| | | | | 222/545 |
| 2012/0241471 A1 * | 9/2012 | Barron | | B65D 5/748 |
| | | | | 222/83 |
| 2012/0284991 A1 * | 11/2012 | Kusz | | A61M 39/12 |
| | | | | 137/315.01 |
| 2017/0113912 A1 | 4/2017 | Johnson | | |
| 2018/0029774 A1 | 2/2018 | Stever | | |

FOREIGN PATENT DOCUMENTS

| | | | |
|---|---|---|---|
| GB | 129216 | * | 7/1919 |
| WO | 2008/014605 A1 | | 2/2008 |

* cited by examiner

PROBE

CROSS REFERENCE TO RELATED APPLICATIONS

This application is related to and claims the benefit of priority to U.S. Provisional Application No. 62/870,937, filed Jul. 5, 2019, which is incorporated herein by reference in its entirety, for all purposes.

BACKGROUND

Generally, this application relates to devices and related methods suitable for dispensing components from packaged products, including, for example, probes and probe assemblies for flexible packaging adapted to cooperate with equipment to dispense flowable products (e.g., beverages, mixes, dairy products, and syrups, etc.) at restaurants, convenience stores, and other retail locations.

Probes and valve assemblies are used in applications that benefit from or require their use in order to access materials, including packaged materials that are sold in sealed boxes, bags, bag-in-box, and/or metal, glass, or plastic containers. For example, conventional probes or valve assemblies are often adapted and configured (e.g., sized and shaped) to be attached securely (e.g., either temporarily or permanently) to a fitment, spout or other type of access point in a packaged product, such as flexible polyethylene liners or bags. While existing probes and valves help to control, meter, or measure the dispensing of packaged products (e.g., flowable products) they often are unable to provide regular and consistent flow when dispensing the product, particularly as the packaging containing the product empties. For example, as the product packaged in a flexible bag is dispensed and the interior volume of the bag empties, the flexible bag can fold-in or crush-in toward its interior and impede or block the flow of the product being dispensed. This can result in incorrect dispensing volumes of product, inaccessible or residual volume of product, and/or time spent accessing and removing the material blocking the access to the product, creating an overall increase in cost and time associated with the use of the product.

The probe provided by the disclosure can overcome at least one or more of the deficiencies that are associated with existing probes in common use in the industry and can, for example, increase the product yield from packaged product, and/or reduce the time and effort required by the end-user in ensuring proper dispensing of the packaged product.

SUMMARY

Generally, the aspect and embodiments provided by the disclosure relate to a probe that is adapted and designed for use with dispensing components for packaging such as, for example, flexible packaging, and cooperates with equipment to dispense flowable material (e.g., liquid products).

In an aspect, the disclosure provides a probe comprising a hollow body having an exterior surface, an interior surface, a nozzle end, a lead-in end that engages a seal or opening, a flange molded to the probe body, and a plurality of flutes on the exterior surface of the probe. In some embodiments the plurality of flutes form protrusions and create a non-planar edge geometry at the lead-in end of the probe. In some embodiments, the non-planar edge geometry comprises rounded, scalloped, squared, pointed, troughed, or serrated shapes.

In some embodiments, the probe comprises from 4 to 20 flutes on the lead-in end of the probe. In some embodiments, the plurality of flutes are symmetrically spaced on the exterior surface of the probe. In some further embodiments, at least two of the plurality of flutes are asymmetrically spaced on the exterior surface of the probe. In some embodiments, the plurality of flutes have approximately the same dimensions. In some further embodiments, at least two of the plurality of flutes have substantially different dimensions.

In some embodiments, the plurality of flutes run along the about 50% of the length of the lead-in end of the probe. In some other embodiments, the plurality of flutes run along no more than 50% of the length from the tip of the lead-in end to the flange.

In any of the above aspects and embodiments, the probe may further comprise an angled nozzle end. In some further embodiments, the angled nozzle end may comprise an angle from about 10 to about 90 degrees from planar. In yet further embodiments, the angled nozzle end may comprise a 90 degree angle.

In any of the above aspects and embodiments, the probe may further comprise a check valve positioned on the interior surface of the probe, and configured to reduce or eliminate leakage of the product from the probe when in use.

In any of the above aspects and embodiments, the probe may further comprise a lock bead on at least a portion of the exterior surface of the probe, and located on the lead-in end.

In any of the above aspects and embodiments, the probe may further comprise on the nozzle end a threaded portion, one or more ribs, or a roughened surface configured to provide a secure fit to an attachment.

Additional aspects and embodiments will be apparent in light of the appended drawings and the following detailed description and examples, which are provided for purposes of illustration. It should be understood, however, that the claims are not limited to the arrangements and instrumentality shown in the attached drawings. Furthermore, the appearances shown in the drawings represent individual examples of many possible appearances, both functional and ornamental that can be employed to achieve one or more of the functional features of the disclosure and its technology.

DETAILED DESCRIPTION

Figure 1A:
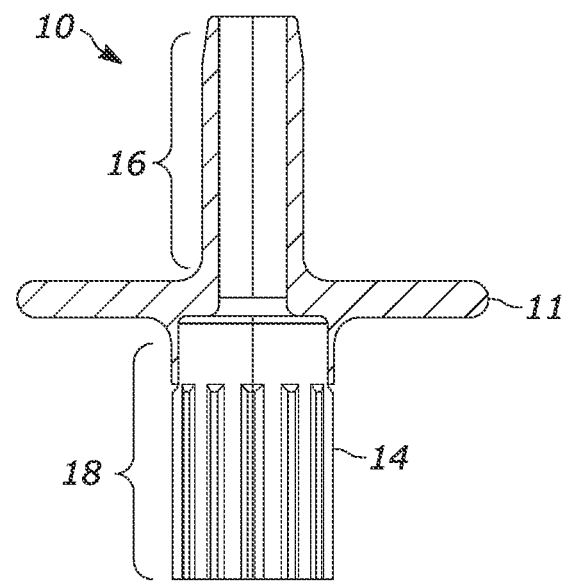
FIG. 1A depicts a side-view of a probe in accordance with an example embodiment of the disclosure. The portion of the probe (i.e., proximate or lead-in end) adapted to fit with the packaging (and/or a fitment) and its interior is presented at the bottom of the Figure, with the exterior-facing portion of the probe (from which the product dispenses, i.e., nozzle end) at the top of the Figure.

Ranges as used herein are intended as shorthand only to avoid listing and describing each and every value within the identified range. Any appropriate value within the range can be selected as the upper value, the lower value, or the end-point of the range.

The singular form of a word includes the plural, and vice versa, unless the context clearly dictates otherwise. Thus, references "a," "an," and "the" generally include the plurals of the respective terms they qualify. For example, reference to "a method" includes its plural-"methods." Similarly, the terms "comprise," "comprises," and "comprising," whether used as a transitional phrase in the claims or otherwise, should be interpreted inclusively rather than exclusively. Likewise, the terms "include," "including," "has," "having," and "or" should be construed to be inclusive, unless such a construction is clearly prohibited from the context. Similarly, the term "examples," particularly when followed by a listing of terms, is intended to be merely exemplary, illustrative, and non-limiting and thus should not be deemed to be exclusive or comprehensive.

Unless defined otherwise, all technical and scientific terms, terms of art, and acronyms used in the disclosure have the meanings commonly understood by one of ordinary skill in the art in the relevant technology field(s) in which the term is used. Although any compositions, methods, articles of manufacture, or other means or materials similar or equivalent to those described in the disclosure can be used in the practice of the various aspects and embodiments herein, specific compositions, methods, articles of manufacture, or other means or materials are described only for purposes of illustration and clarity.

All patents, patent applications, publications, technical and/or scholarly articles, and other references cited or referred to herein are incorporated in their entirety by reference to the extent allowed by law. The discussion of those references is intended merely to summarize the assertions made in these references. No admission is made that any such patents, patent applications, publications or references, or any portion thereof, are relevant, material, or prior art to the disclosure or the scope of claims.

As used herein, the term "flowable material" encompasses any liquid, semi-solid, gel, emulsion, or similar materials which are flowable under gravity or may be pumped. Such materials include liquids (for example, syrup, mixes, alcohol, milk, water, fruit juice, oil, etc.), semi-solid and liquid emulsions (for example, ice cream, ice cream mix, soft margarine, whipping cream, doughs, etc.). The aspects and embodiments described herein find particular use for flowable foods and beverages, including those that may be packaged at ambient or at refrigerated temperatures.

In a general sense, the disclosure provides probes having improved structure relative to the probes that are commonly used in the art for dispensing flowable material. The structural features of the probes described herein comprise a plurality of flute structures on the exterior surface of the lead-in (or proximate) end of the probe, and which can provide for improved emptying and product flow (e.g., regular, consistent, and/or unimpeded flow) in use, and avoids blockage (e.g., by flexible packaging containing the product) as the product is dispensed.

In accordance with the aspects and example embodiments of the disclosure, a probe may be adapted to interact (e.g., securely engage either permanently or temporarily) with a fitment or spout, or other known type of opening or access point, that is attached to a container holding a flowable product or material. The engagement between the probe and the opening typically forms a liquid tight seal. In example embodiments the container may be a flexible bag made from one or more plastic materials or a semi-rigid container, also of a plastic material, that holds the flowable product or material (e.g., liquids or semi-solids) that are to be dispensed. The probe in accordance with example embodiments of the disclosure can be adapted and sized according to the size of the fitment, spout, opening, or access point, as well as to the volume, size, and/or shape of the bag or container so that a desired level of flow through the probe can be achieved. A wide variety of liquids or semi-solids can be dispensed through the probe including, for example, viscous, but flowable, (liquid) foods, for example, coffee, soda, milk, cooking oil, syrups, water, drink mixes, as well as flowable (liquid) chemicals such as, for example, detergents, cleaning liquids, hand soap, pastes, and adhesives/glues.

In some aspects and embodiments, such as those illustrated by the Figures, a probe 10 may be formed by casting, molded (e.g., injection molded) or 3D printed from a variety of materials as discussed herein. A probe in accordance with the example aspects and embodiments herein generally comprises a hollow, cylindrical body having a lead-in or proximal end and a distal end, the distal end (sometimes referred to herein as the "nozzle end") forming a nozzle having a structure (e.g., nipple, threads, protrusions, spout, etc.) capable of mating with a tube, hose, lead-in line, or other opening configured to receive product. The probe may also comprise a flange on the outer surface of the probe which extends around at least a portion of the circumference of the probe, and which generally separates the lead-in and distal end of the probe. The lead-in end typically comprises an external surface adapted or configured to mate (e.g., frictional, secured fit) with a fitment, spout or other access point and a plurality of flutes. In use product flows through the probe when it is securely fit to the packaging (e.g., to a fitment and penetrating any seal or cap in the packaging).

Referring to the illustrative embodiment of FIG. 1A, a probe comprises a body having a nozzle end 16, and a lead-in end 18 that engages a seal or opening, a flange 11 molded to the probe body that presses against or abuts a fitment, seal, or opening engaged by the proximate end of the probe, and a plurality of depressions or flutes 14 on the exterior surface of the probe.

In some embodiments, the plurality of flutes 14 are positioned on the exterior surface of the proximate, or lead-in, end and are oriented parallel to each other and to the direction of product flow through the probe. The plurality of flutes are positioned on the end of the lead-in end and generally form a structure that creates a non-planar edge geometry on the lead-in end. In various aspects and embodiments, the number of the plurality of flutes on the exterior surface of the probe may vary depending on the size of the flutes relative to the size of the probe. In some embodiments the probe comprises a plurality of flutes wherein the plurality may be 4, 5, 6, 7, 8, 9, 10, 11, 12, 13, 14, 15, 16, 17, 18, 19, or 20 flutes or more. In some embodiments, the probe comprises from about 8 flutes to about 16 flutes on its exterior surface. In some embodiments the plurality of flutes may be asymmetrically arranged around the exterior surface of the probe. In some embodiments the plurality of flutes may be symmetrically arranged around the exterior surface of the probe. In some embodiments the plurality of flutes may comprise one or more flutes having one or more different dimensions. In some embodiments the plurality of flutes may have the same dimensions.

In some embodiments the plurality of flutes may have a length that varies relative to the length of the lead-in end of the probe (i.e., the region bounded by the terminal end of the lead-in end and the flange). Thus, the length of the plurality of flutes may vary, as long as the length of the flutes (a) do not create any leaks between the liquid-tight seal formed by the engagement of the probe and fitment/seal or opening, and/or (b) provide for the improved flow characteristics of the probe design described herein. In some embodiments the plurality of flutes may run along the exterior surface of the probe for a length that spans substantially the entire length from the lead-in (proximate) end to the flange. In some embodiments the plurality of flutes may run along the exterior surface of the probe over a length of about 5% to about 50% (e.g., 5%, 10%, 15%, 20%, 25%, 30%, 35%, 40%, 45%, or 50%) of the length of the lead-in end. In these aspects and embodiments, the plurality of flutes include the portion of the lead-in end that forms the tip or terminal end of the probe that accesses the packaged product. As discussed above, embodiments described herein comprise a plurality of flutes that are positioned on the end of the lead-in end and generally protrude from the body of the probe to form a structure that creates a non-planar edge geometry on the lead-in end. In some embodiments, the plurality of flutes protrude from the body of the probe and to create a non-planar edge geometry that can be rounded, scalloped, squared, pointed, troughed, or serrated, and the like.

In some embodiments the plurality of flutes may have a depth that varies, as long as the depth of the flutes (a) do not create any leaks between the liquid-tight seal formed by the engagement of the probe and fitment/seal or opening, and/or (b) provide for the improved flow characteristics of the probe design described herein. In some embodiments the plurality of flutes may have a depth that is about 5% to about 50% (e.g., 5%, 10%, 15%, 20%, 25%, 30%, 35%, 40%, 45%, or 50% or more) of the wall thickness of the lead-in end.

In some embodiments the plurality of flutes may have any geometry or shape. While many of the example embodiments disclosed herein to illustrate the probe comprise linear flutes, other shapes are contemplated. In some embodiments the flutes along some portion of their lengths may cross or intersect each other. Similarly, while many of the example probe embodiments disclosed herein depict the cross-sectional shape of the troughs or depressions of the flutes as squared or rounded, the cross-sectional geometry may be any of a variety of shapes. For example, in some embodiments the plurality of flutes may have a cross-sectional shape or geometry that comprises a semi-circular shape (e.g., a trough with a rounded bottom), a triangular shape (e.g., a trough with a pointed bottom), a squared or rectangular shape (e.g., a trough with a flat bottom), or the like (e.g., hexagonal, octagonal shapes).

The total length of the probe 10 may vary depending on its particular application and use. Thus, the general description of the dimensions that follow can be modified depending on factors that will be apparent to one of skill in the art (e.g., the package volume size, the viscosity of flowable product being dispensed, temperature, dispensing speed, etc.). In some embodiments, the probe length falls within a range of at least about 1 inch to about 4 inches (e.g., 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4.0 inches). In some embodiments the total length of the probe is from about 1 inch to about 2 inches, (e.g., 1.1, 1.2, 1.3, 1.4, 1.5, 1.6, 1.7, 1.8, 1.9, or 2.0 inches). In embodiments the length of the nozzle 16 of the probe 10 is from about 0.25 inch to about 2.0 inches (e.g., 0.25, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 inches). In embodiments, the inner and outer diameter of the nozzle 16 of the probe can be adapted to fit with a variety of attachments (e.g., hoses, lead-lines, or other openings) that are commonly attached to nozzles that dispense a product. In some embodiments, the nozzle end diameter may range from about 0.1 inch to about 0.5 inch, (e.g., 0.1, 0.15, 0.2, 0.25, 0.3, 0.35, 0.4, 0.45, or 0.5 inches) and can be attached to a hose. Typically, the hoses are attached to the nozzle 16 by a friction fit of the hose to the nozzle; however, other methods also can be used, such as, a hose clamp or the exterior of the nozzle may be provided with ribs, threads (e.g., screw threads), or with a roughened surface for a better friction fit. In some embodiments, the inner or outer diameter of the probe, as well as the nozzle and lead-in ends are about 0.5 inch to about 1.5 inches (e.g., 0.5, 0.55, 0.6, 0.65, 0.7, 0.75, 0.8, 0.85, 0.9, 0.95, 1.0, 1.1, 1.15, 1.2, 1.25, 1.3, 1.35, 1.4, 1.45, or 1.5 inches).

Typically, the thickness of the walls of the probe falls within a range of about 0.2 inches and 0.01 inches, and may have variation in its thickness throughout the length of the probe (ranging from, for example, about 0.095 inch in the nozzle section and about 0.05 inch at edge of the flange) and may be modified depending on the product to be dispensed.

The geometry and diameter of the flange 11 that separates the lead-in end and the nozzle end of the probe, and that may press against the fitment 30 (e.g., cap) can be adapted depending on the width of the fitment or opening, but in some embodiments is within a range of about 1 inch to about 3 inches. In some embodiments, the flange may be reinforced with one or more ribs or other designs that strengthen the flange. In some embodiments the flange is formed over only a portion of the circumference of the probe surface.

In some embodiments the probe body may comprise an optional locking bead on its exterior surface, which may be adapted and designed so that it helps to securely engage and form a seal between the probe and fitment/opening. Thus, in some embodiments, a locking bead of the probe can attach to a fitment to form a seal with the fitment. In some embodiments, the lock bead may be located on the lead-in end of the probe, generally in an region between the end of the plurality of flutes and the flange In some embodiments, the probe may be constructed from a molded thermoplastic material. In some embodiments the thermoplastic material can comprise a polyolefin such as, for example, polyethylene, copolymers and terpolymers of polyethylene, polypropylene, copolymers and terpolymers of polypropylene, polybutylene and copolymers and terpolymers thereof, fluorocarbon polymers and copolymers thereof, polyvinyl chloride and copolymers thereof, polyvinylidene chloride and fluorocarbon polymers and copolymers thereof. In some embodiments, thermosetting polymers such as, for example, epoxy resins, phenolic resins, melamine resins can also be used in the construction of the probe. In some particular embodiments the probe comprises polyethylene, polypropylene or copolymers or terpolymers thereof, and may be used in combination.

Referring to the Figures, FIG. 1A illustrates a side view schematic drawing of an example embodiment of a probe, in accordance with the disclosure. The probe 10 has a nozzle end 16, a lead-in or proximate end 18, a flange 11, and a plurality of flutes 14 oriented on the exterior surface at the lead-in end of the probe. In the embodiment illustrated in FIG. 1A, the plurality of flutes are depicted as symmetrical and are symmetrically spaced on the outer surface of the probe. As described herein, the plurality of flutes function to maintain consistent product flow from the bag, preventing any blockage or impeded product flow as the packaging or bag empties and collapses on itself and nears the opening of the lead-in end of the probe. Without being limited by any proposed mechanism, the plurality of flutes that form protrusions and create a non-planar edge geometry at the terminal end of the lead-in end of the probe may provide for some amount of the improvement in probe performance.

Figure 1B:
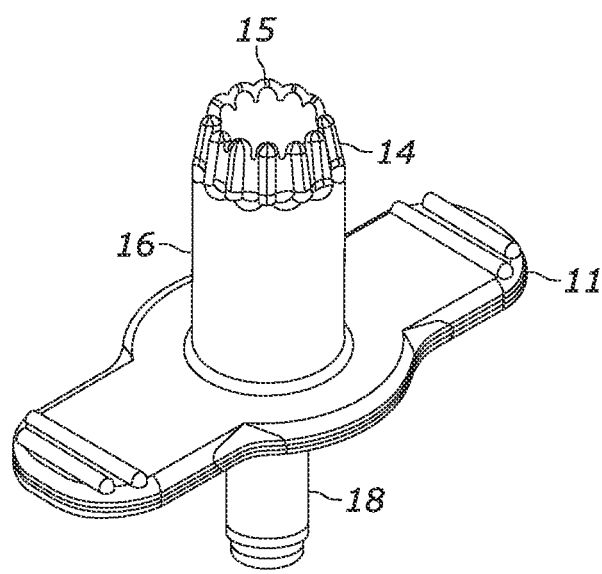
FIG. 1B depicts a side-angled rear view of a probe in accordance with an example embodiment of the disclosure, providing detail of the interior-facing portion (lead-in end) of the probe that attaches to a packaging access point (e.g., spout, seal, and/or fitment) and contacts the product contained within the packaging, when fully engaged with the packaging.
Figure 1C:
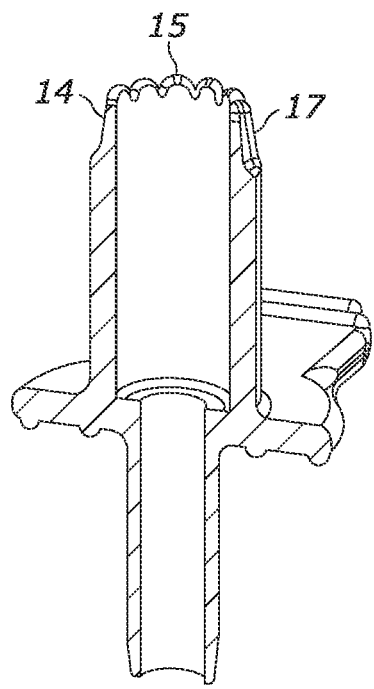
FIG. 1C depicts a cutaway side view of a side-angled, rear view of a probe in accordance with an example embodiment of the disclosure.
Figure 1D:
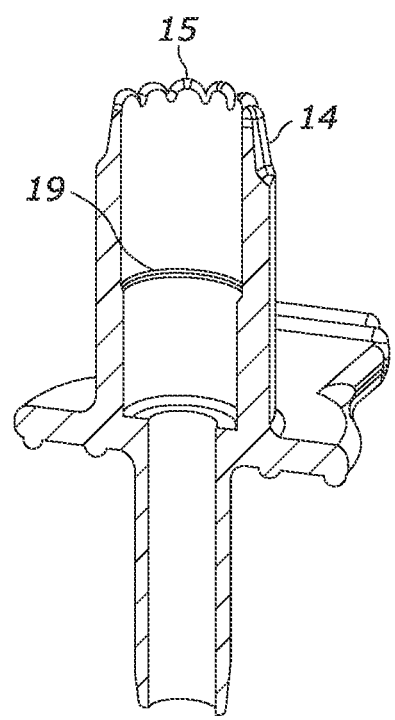
FIG. 1D depicts a cutaway side view of a side-angled, rear view of a probe in accordance with an example embodiment of the disclosure, which illustrates an alternative embodiment of structure within the interior hollow portion of the probe.

FIGS. 1B-1D illustrate alternative embodiments and views of the probe 10 having a nozzle end 16, a lead-in or proximate end 18, a flange 11, and a plurality of flutes 14 oriented on the exterior surface at the lead-in end of the probe and create protrusions (i.e., a non-planar edge geometry) 15. The orientation of the probe in FIGS. 2B-2D, provide additional embodiments of the plurality of flutes 14 (about ten or twelve flutes), the flutes 14 having a taper 17 toward the tip of the lead-in non-planar edge 15 of the probe.

The cutaway side view of FIGS. 1C and 1D illustrate a difference in the hollow interior of the probe, wherein FIG. 2D includes a ridge 19 or tapering/narrowing in the internal diameter of the probe.

Figure 2A:
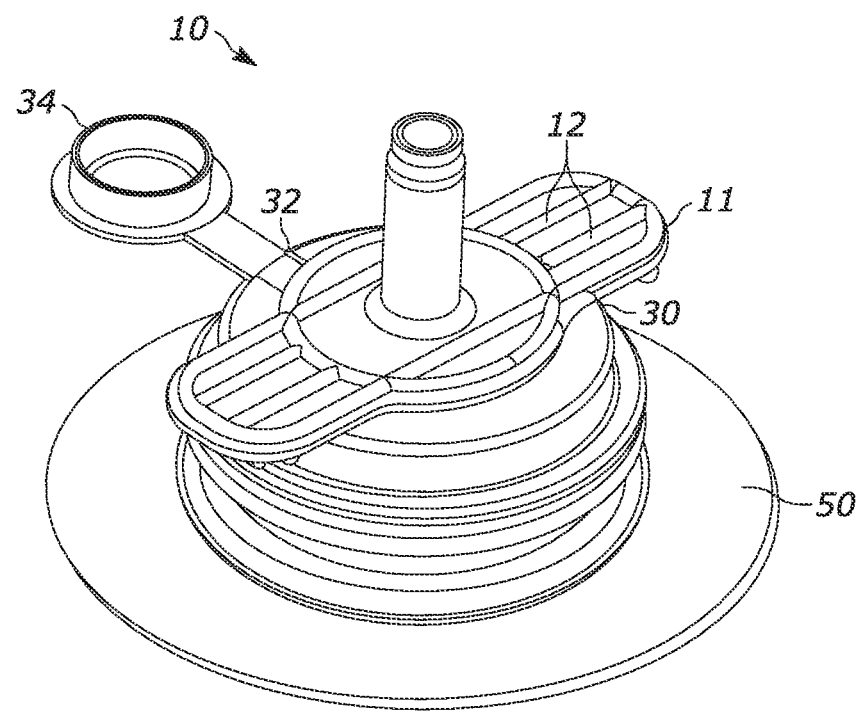
FIG. 2A depicts a side-angled front view of a probe in accordance with an example embodiment of the disclosure, engaged and securely affixed to a flip cap fitment.
Figure 2B:
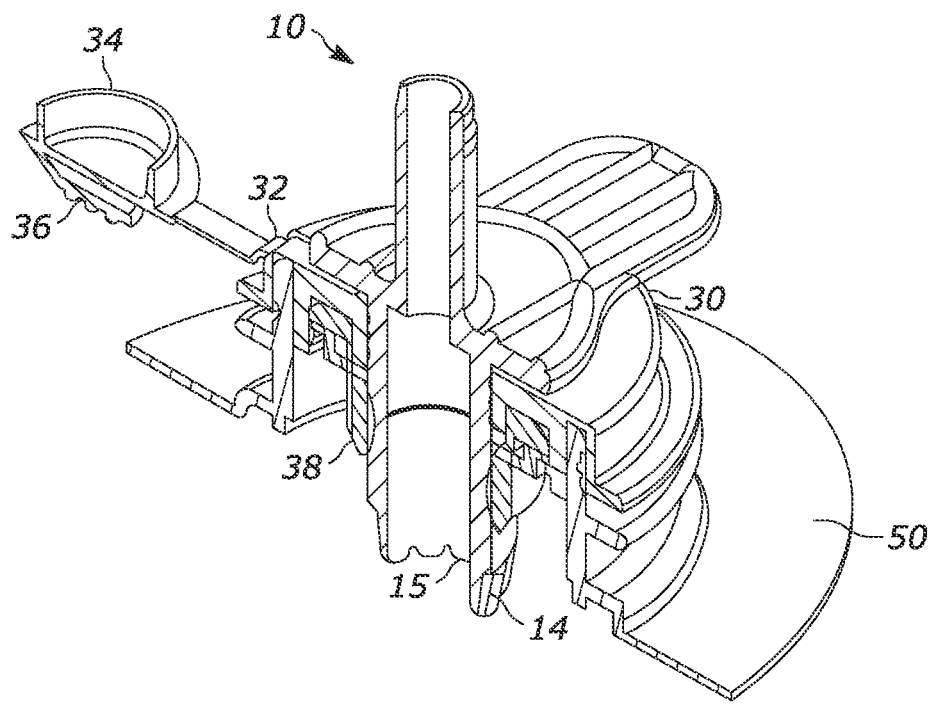
FIG. 2B depicts a cutaway view of the probe and fitment illustrated in FIG. 2A.

FIGS. 2A and 2B depict an example embodiment of a probe 10, fitment 30, and spout 50 securely engaged to form a seal. In this depiction the probe 10 as generally described in FIGS. 1A-1D includes a flange 11 that is reinforced with one or more flange-strengthening ribs 12. In the embodiment depicted by FIGS. 2A-2B, the fitment 30 comprises a flip cap 32 having a flip lid 34 with a pull tab 36. An optional duckbill check valve 38 is included in the cap 32. An optional duckbill lock ring (not shown) may be positioned between the cap duckbill 38 and the spout 50. When the duckbill lock ring is present, it can engage the cap duckbill 20 assisting in forming a liquid seal with the spout 50, locking the spout into cap 30 helping to prevent seepage or leakage of liquid that is to be dispensed from the bag or container (not shown) to which spout 50 is attached. FIG. 2B provides a cutaway side view of the probe engaged with the fitment as shown in FIG. 2A.

Figure 3A:
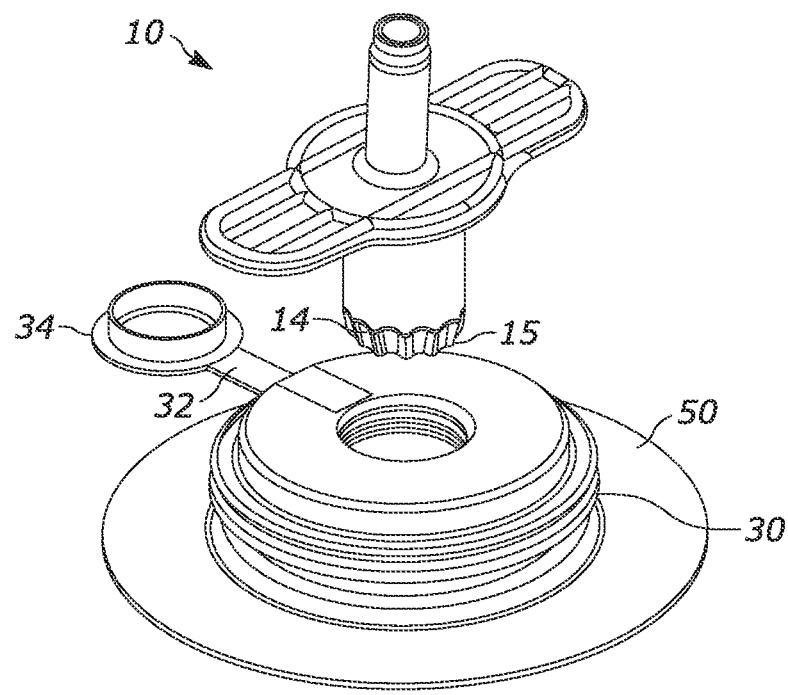
FIG. 3A depicts a side-angled front view of a probe in accordance with an example embodiment of the disclosure, oriented to a flip cap fitment/seal, prior to being engaged/securely affixed to the flip cap fitment/seal.
Figure 3B:
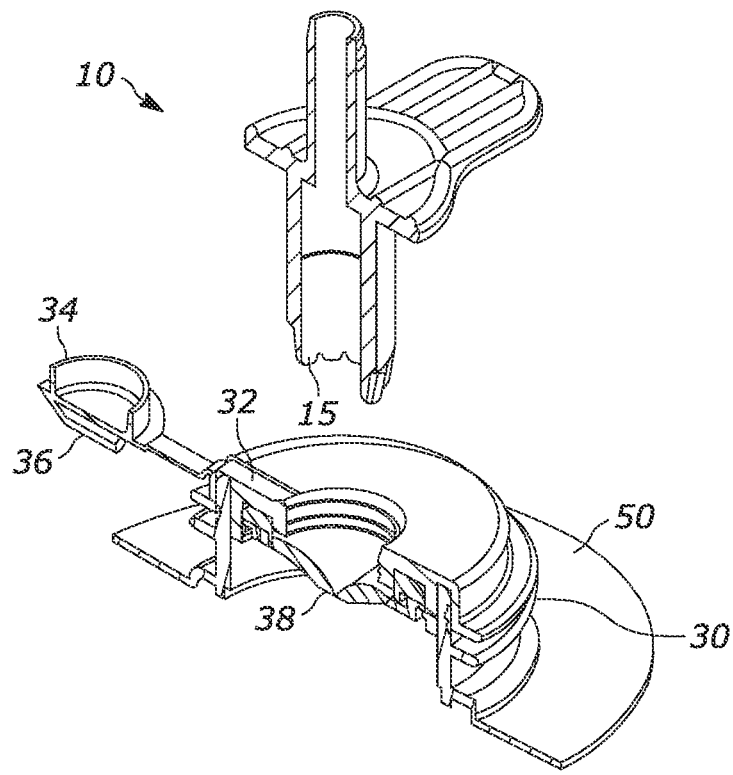
FIG. 3B depicts a cutaway view of the probe and fitment illustrated in FIG. 3A.

FIGS. 3A and 3B depict an example embodiment of a probe 10, a fitment 30 and a spout 50, as generally shown in FIGS. 2A and 2B, oriented to each other prior to being securely engaged to form a seal.

Figure 4A:
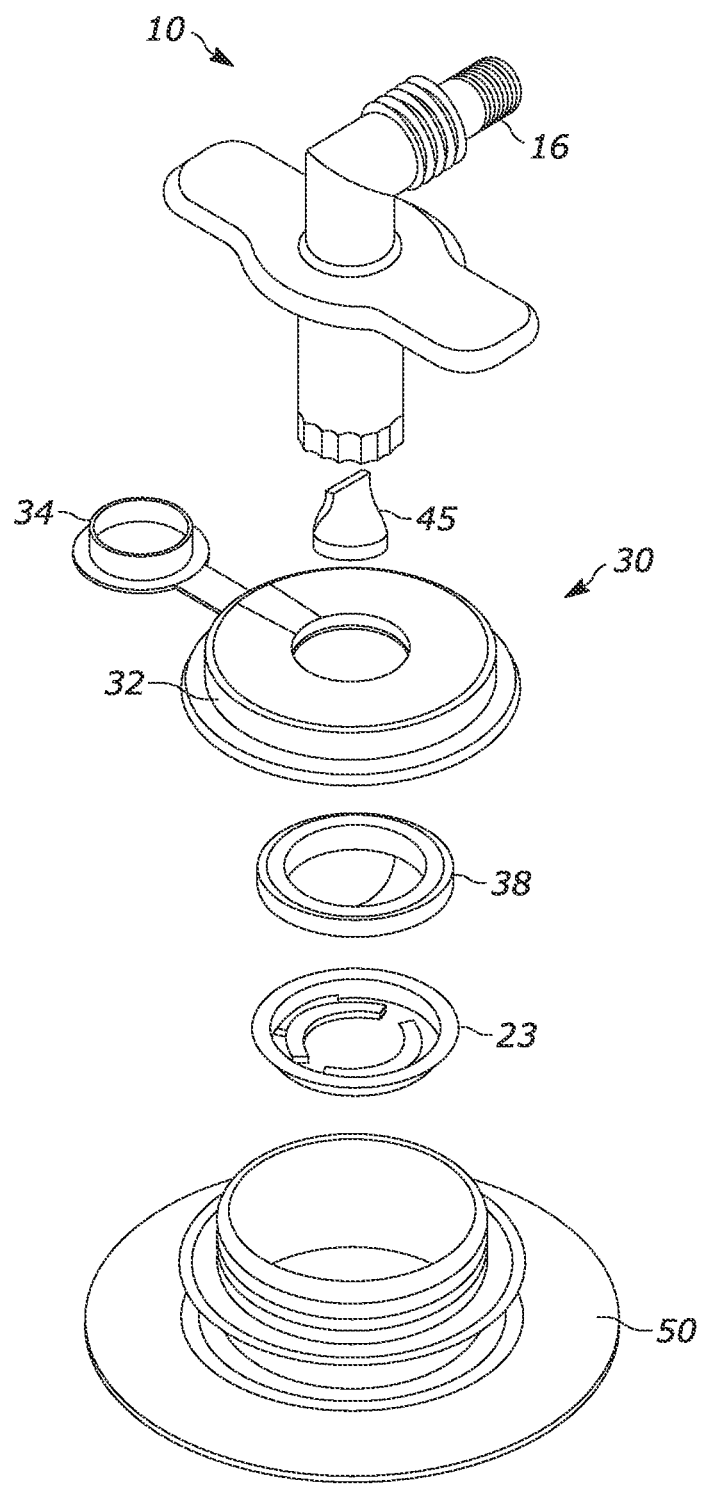
FIG. 4A depicts an exploded view of components of a probe in accordance with an example embodiment of the disclosure. In this embodiment, the probe comprises a 90 degree spout in addition to a check flow valve positioned in its interior hollow portion of the proximate or lead-in end. Optional components of a flip cap fitment are also illustrated.
Figure 4B:
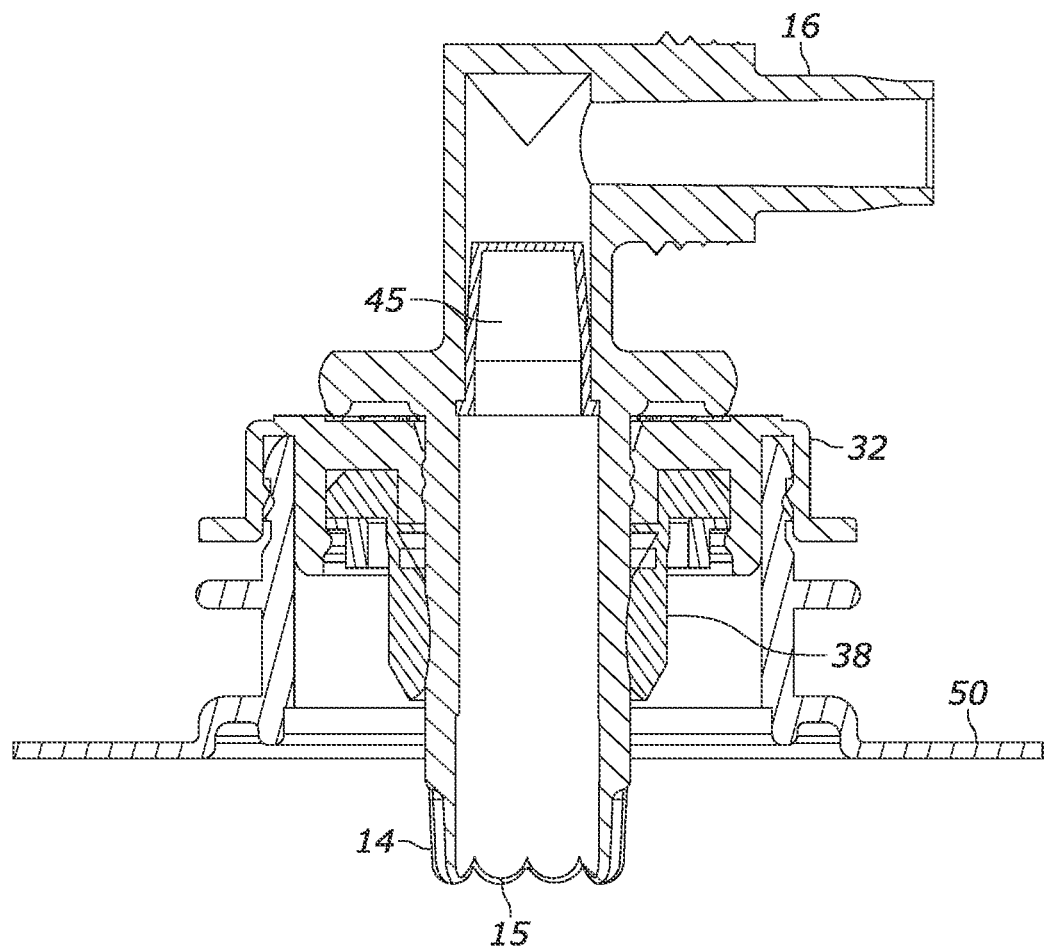
FIG. 4B depicts cutaway side view of a probe in accordance with an example embodiment of the disclosure that is seated in a fitment, with some of the components as generally illustrated in FIG. 4A.

FIG. 4A illustrates an alternative embodiment of a probe in accordance with the aspects and embodiments described herein. The figure depicts an exploded view of components of a probe 10, fitment 30, and seal 50 in accordance with an example embodiment of the disclosure. In this embodiment, the probe 10 comprises a 90 degree nozzle end 16 in addition to a check flow valve 45 positioned in the interior hollow portion of the probe. The fitment 30 and the spout 50 are shown, where the fitment 30 comprises a flip cap 32 having a flip lid 34. A duckbill check valve 38 is included in the cap 32 and with an optional duckbill lock ring 23. FIG. 4B illustrates a cutaway side view of the engagement of the probe 10 with the plurality of flutes 14 having non-planar edge geometry 15 and optional duckbill check flow valve 45; fitment 30 with cap 32 and duckbill check valve 38; and spout 50 as shown in FIG. 5A, but without the optional duckbill check valve lock ring.

Figure 5A:
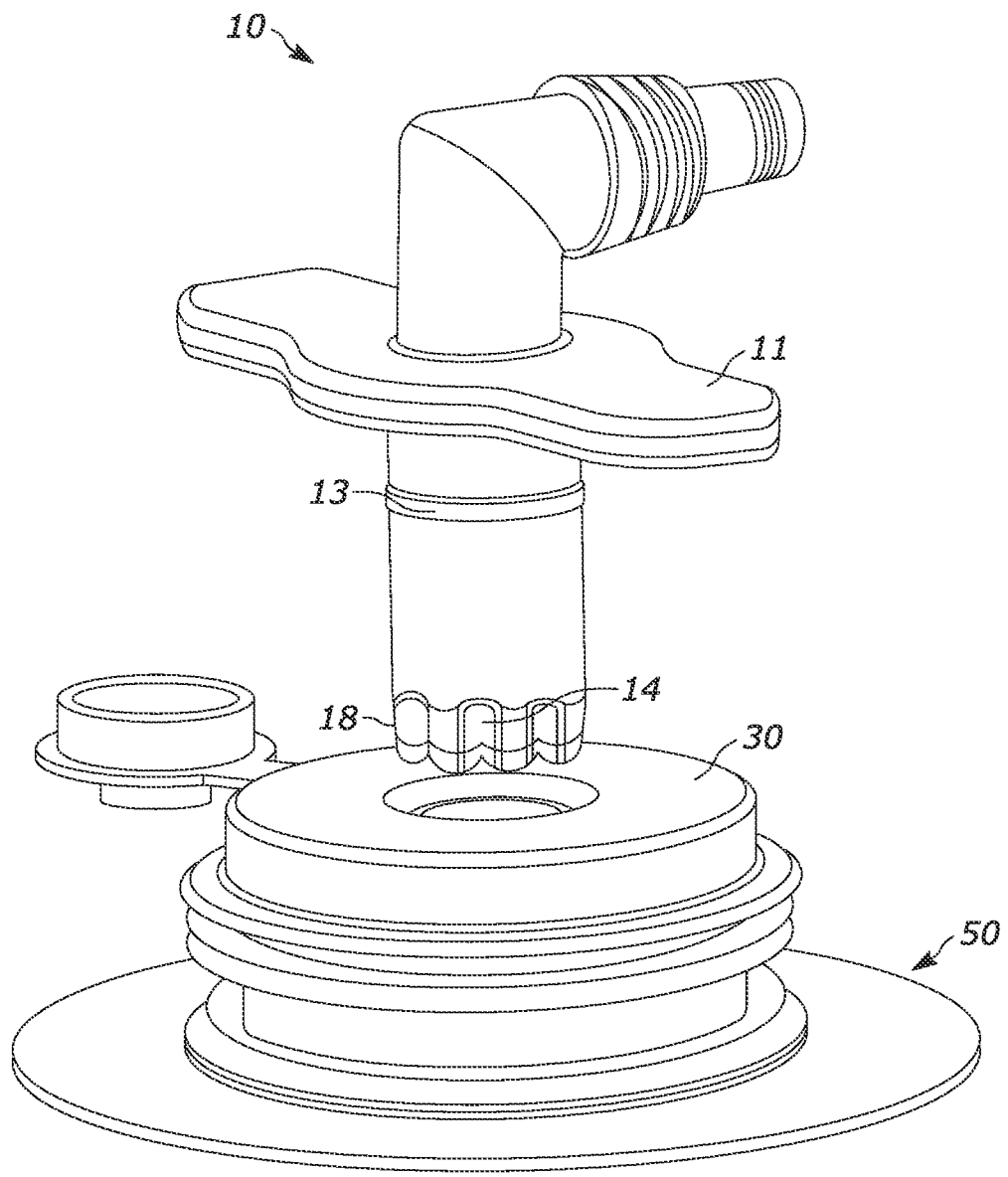
FIG. 5A depicts a probe in accordance with an example embodiment of the disclosure. In this embodiment, the probe comprises a 90 degree spout and a lock bead on the lead in end (as illustrated, between the flange and the plurality of flutes) that circles at least a portion of the perimeter of the exterior surface of the probe. The probe and the fitment are oriented to each other prior to engagement.
Figure 5B:
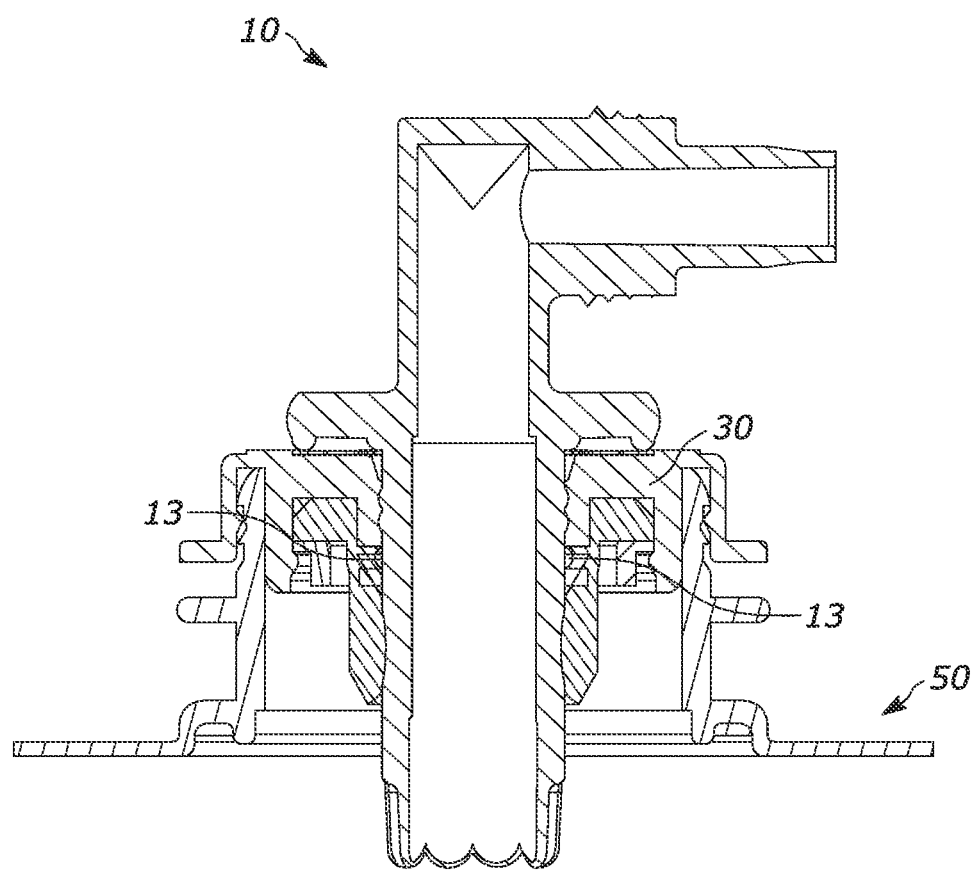
FIG. 5B depicts a cutaway side view of a probe in accordance with an example embodiment of the disclosure. This embodiment generally depicts the probe as illustrated in FIG. 5A comprising a 90 degree spout and a lock bead, where the probe and fitment are engaged, and the lock bead is shown as engaging with a portion of the fitment and providing a more secure connection and seal.
Figure 5C:
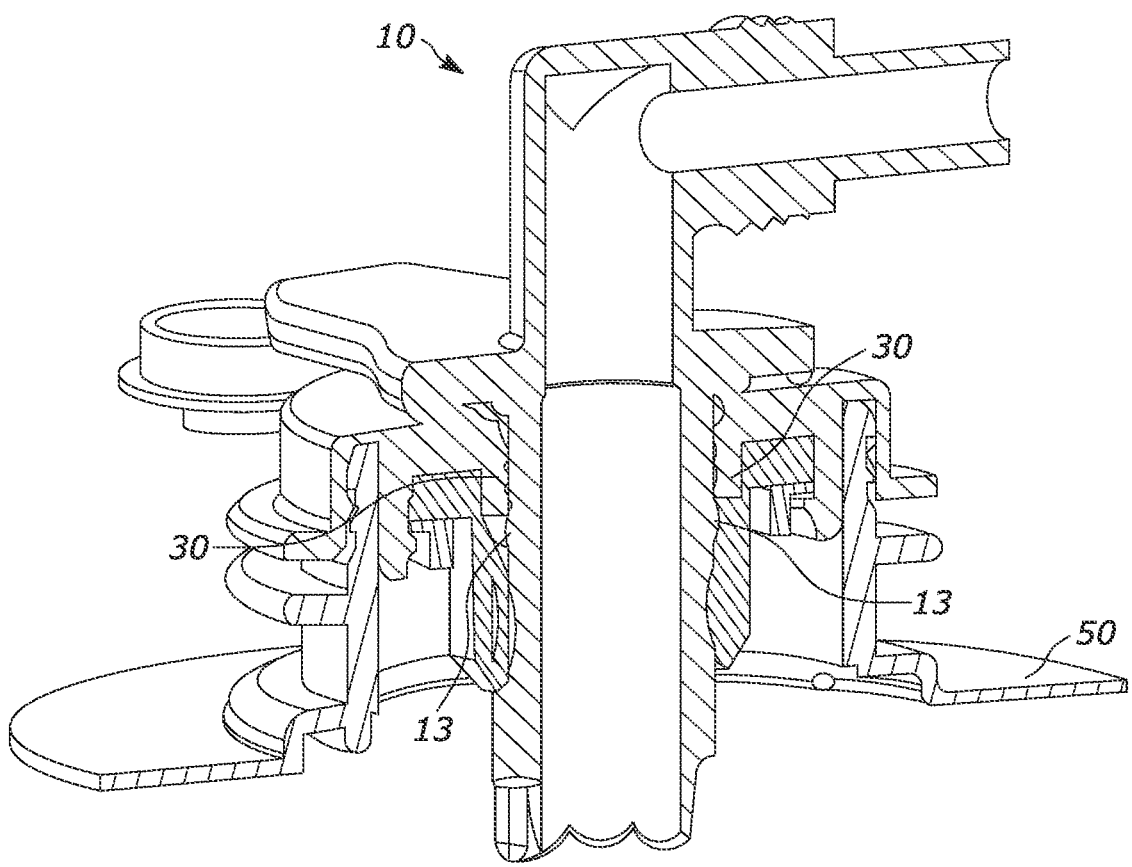
FIG. 5C depicts an alternative cutaway side view of a probe and fitment as generally shown in FIGS. 5A and 5B illustrating the engagement between the lock bead and fitment.
Figure 6:
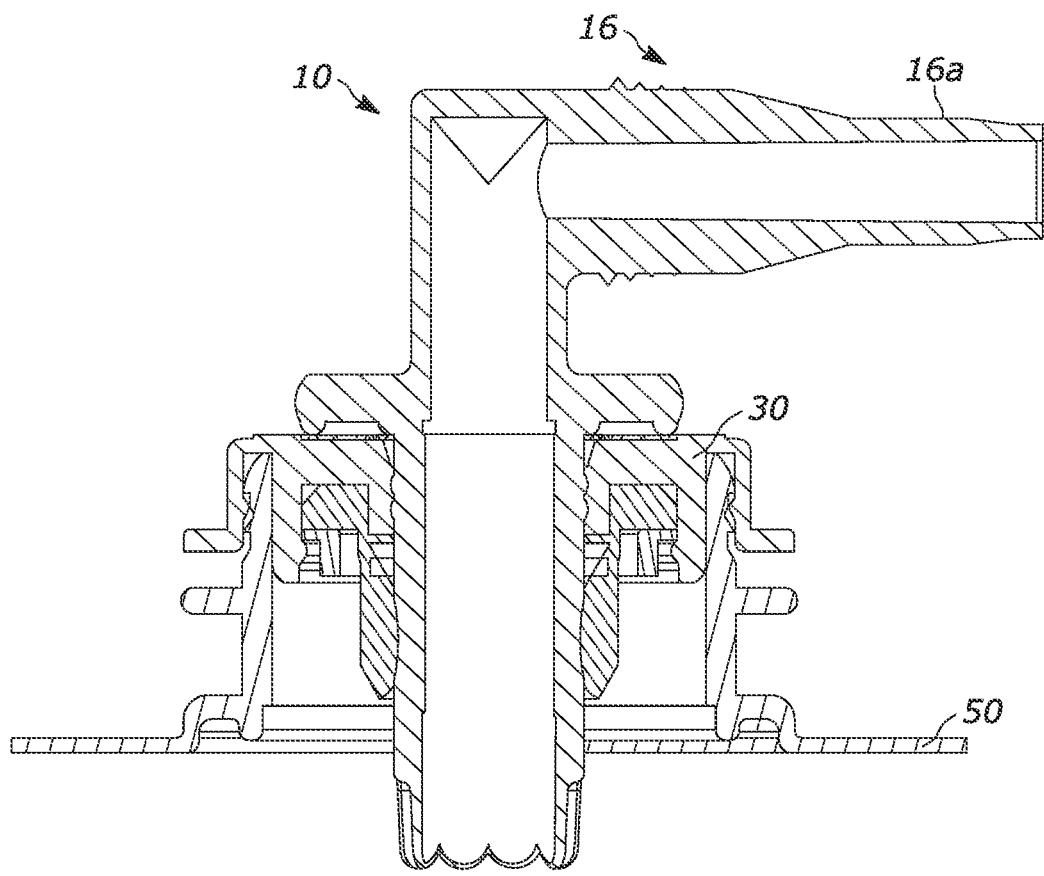
FIG. 6 depicts a probe in accordance with an example embodiment of the disclosure. In this embodiment, the probe comprises a 90 degree spout, wherein the spout may be elongated in order to allow for easier connection (secured friction-fit attachment/access for detachment) to a fixture such as a hose or another tube, lead-line, or opening that is configured to receive a packaged product.

FIGS. 5A-5C illustrate an alternative embodiment of a probe in accordance with the aspects and embodiments described herein. The FIG. 5A depicts a probe 10, fitment 30, and spout 50, wherein the probe comprises a locking bead 13 molded on the exterior surface of the probe between the flange 11 and end of the plurality of flutes 14 on the lead-in end 18. FIGS. 5B and 5C illustrate a cutaway side views of the engagement of the probe 10, fitment 30, and spout 50 as shown in FIG. 6A and illustrate alternative views showing the interaction between the locking bead 13 and fitment 30.

FIG. 7 illustrates an alternative embodiment of a probe in accordance with the aspects and embodiments described herein. The figure depicts a cutaway side view of a probe 10, fitment 30, and spout 50, where the probe 10 comprises a 90 degree nozzle end 16 that is extended or elongated 16a in order to allow for easier connection (attachment/detachment) to a fixture such as a hose or another opening that receives a packaged product. The nozzle end 16 also includes threading, ridges, or roughened exterior surface to help secure attachment to an optional attachment line or opening.

The probe as disclosed herein, in combination with an optional fitment, can be used in methods of dispensing a flowable product from a package, suitably a package comprising a flexible material such as a bag or bag-in-box package. The probe provides for improved methods of dispensing a product that may, for example, improve consistency of product flow, reduce occurrence of impeded flow, improve the emptying of the product from the packaging, and/or avoid blockage of product flow caused by, for example, flexible packaging collapsing inward during dispensing of product and blocking the probe opening.

The disclosed embodiments are not limited to the specific arrangement or components discussed with respect to those embodiments. For instance, the various embodiments that include a particular fitment (e.g., cap) or spout may alternatively not include a cap. Similarly, the embodiments disclosed herein are not limited to the specific polymers or materials discussed with respect to those embodiments. Any number of different kinds of polymers having different properties can be used with the embodiments disclosed herein.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A probe comprising a hollow body having an exterior surface, an interior surface, a nozzle end, a lead-in end that engages a seal or opening, a flange molded to the probe body, and a plurality of flutes on the exterior surface of the probe at the lead-in end and defining an opening at an edge of the lead-in end, wherein the plurality of flutes are individually spaced and arranged along the entirety of the exterior surface of the probe.

2. The probe of claim 1, wherein the plurality of flutes form protrusions that extend out at the edge of the lead-in end of the probe around the opening.

3. The probe of claim 1, wherein the probe comprises from 4 to 20 flutes on the lead-in end of the probe.

4. The probe of claim 1, wherein the plurality of flutes have the same dimensions.

5. The probe of claim 1, wherein at least two of the plurality of flutes have substantially different dimensions.

6. The probe of claim 1, wherein the plurality of flutes run along the about 50% of the length of the lead-in end of the probe.

7. The probe of claim 1, wherein the plurality of flutes run along no more than 50% of the length from the tip of the lead-in end to the flange.

8. The probe of claim 1, further comprising a 90 degree junction at the nozzle end such that an opening at the nozzle end is at a 90 degree angle to the opening of the lead-in end.

9. The probe of claim 1, further comprising a check valve positioned on the interior surface of the probe, and configured to reduce or eliminate leakage of the product from the probe when in use.

10. The probe of claim 1, further comprising a lock bead on at least a portion of the exterior surface of the probe, and located on the lead-in end.

11. The probe of claim 1, further comprising on the nozzle end a threaded portion, one or more ribs, or a roughened surface configured to provide a secure fit to an attachment.

12. The probe of claim 2, wherein the protrusions define non-planar edge geometry that comprises rounded, scalloped, squared, pointed, troughed, or serrated shapes.

13. The probe of claim 1, wherein a majority of the length of the body from the flange to the lead-in end has the same outer diameter.

* * * * *